United States Patent [19]

Senoh et al.

[11] Patent Number: 4,811,248
[45] Date of Patent: Mar. 7, 1989

[54] METHOD OF AN APPARATUS FOR DETERMINING WORKING ORIGINAL POINT FOR MULTI-JOINT MANIPULATOR

[75] Inventors: Makoto Senoh, Ibaraki; Fumio Tomizawa, Hitachi; Akihito Sekido, Hachioji; Masanori Suzuki, Hitachi; Sakae Sugiyama, Iaraki; Tomiharu Yoshida, Katsuta, all of Japan

[73] Assignee: Hitachi, Ltd., Tokyo, Japan

[21] Appl. No.: 20,889

[22] Filed: Mar. 2, 1987

[30] Foreign Application Priority Data

Feb. 28, 1986 [JP] Japan .................................. 61-43715

[51] Int. Cl.$^4$ .......................... B25J 9/00; G05B 19/18
[52] U.S. Cl. ..................................... 364/513; 364/148; 364/167.01; 401/2; 401/15
[58] Field of Search ............... 364/513, 148, 170, 167, 364/174, 176, 191–194; 901/2, 15; 414/909

[56] References Cited

U.S. PATENT DOCUMENTS

| | | | |
|---|---|---|---|
| 3,909,600 | 9/1975 | Hohn ................................ | 364/300 |
| 4,168,782 | 9/1979 | Sturges, Jr. ........................... | 901/15 |
| 4,403,281 | 9/1983 | Holmes et al. ...................... | 364/170 |
| 4,433,382 | 2/1984 | Cunningham et al. ................. | 901/9 |
| 4,600,869 | 7/1986 | Sekine et al. ......................... | 318/569 |
| 4,604,561 | 8/1986 | Kamajima et al. ................... | 318/561 |
| 4,604,716 | 8/1986 | Kato et al. ........................... | 364/513 |
| 4,663,726 | 5/1987 | Chand et al. ........................... | 901/9 |
| 4,698,572 | 10/1987 | Stone ................................... | 364/513 |

OTHER PUBLICATIONS

Y. C. Tasai, "Accessible Region and Synthesis of Robot Arms", Journal of Mechanical Design, Oct. 81, vol. 103.
J. Y. S. Luh, "Optimum Path Planning for Mechanical Manipulators" Transactions of the ASME, vol. 102, Jun. 1981.

Primary Examiner—Jerry Smith
Assistant Examiner—Paul Gordon
Attorney, Agent, or Firm—Antonelli, Terry & Wands

[57] ABSTRACT

A method of and apparatus for determining a position of a working original point at which working characteristics of a multi-joint manipulator are at optimum. According to the method and apparatus, a working point at which a hand mounted on the multi-joint manipulator works and a workspace needed for the work are assigned. Subsequently, a set of positions of the working original point of the multi-joint manipulator at which the hand may reach the workspace is calculated. Also, values of evaluation functions representative of preference of the working characteristics of the multi-joint manipulator are calculated with respect to the respective positions of the set. Then, the values of the evaluation functions are compared with each other, thereby selecting the position of the working original point at which the working characteristics are at optimum.

10 Claims, 10 Drawing Sheets

METHOD OF AN APPARATUS FOR DETERMINING WORKING ORIGINAL POINT FOR MULTI-JOINT MANIPULATOR

BACKGROUND OF THE INVENTION

The present invention relates to a method of and an apparatus for determining a position of an optimum working origin or original point for working characteristics of a multi-joint manipulator.

In atomic power generation plants or the like, a manipulator with plural revolute joints is used in order to protect the operators from hazardous works. The manipulator is operated under a remote control. In particular, for the works such as maintenance and inspection of the instrument in limited or narrowed spaces, it is necessary that the manipulator be free from various obstacles to approach the objects to which the work is to be applied.

In such works, the posture of the multi-joint manipulator that has approached the objects to be worked is not always suitable for the intended work so that its working efficiency would be degraded. In order to solve this problem, it is necessary to determine an optimum working original point for the manipulator. The working original point is defined by a point where degrees of freedom (DOF) of the proximal end of the multi-joint manipulator is situated, that is, by a center of motion of a movable part of a revolute joint that is most remotely positioned from the hand of the manipulator.

Upon operating a multi-joint manipulator, the most suitable orientation or posture of the manipulator for an intended work and the working original point most suitable for that orientation necessarily exist for any working operation for any object to be worked. Therefore, whenever any working operation is conducted by the multi-joint manipulator, it is preferable to determine the optimum working original point.

Hitherto, no consideration has been given to the above-noted problem. There has been no technical concept for determining the working original point of the multi-joint manipulator.

SUMMARY OF THE INVENTION

An object of the present invention is to provide a method of determining a position of the working original point of a multi-joint manipulator that is suitable for the work to be made by the multi-joint manipulator.

Another object of the present invention is to provide an apparatus for determining the optimum working original point to enhance the working characteristics of the multi-joint manipulator at optimum.

According to the present invention, there is provided a method of determining a working original point for a multi-joint manipulator, which comprises the steps of assigning a working point where a hand mounted at a distal end of the multi-joint manipulator is operated and a working space needed for the work of the multi-joint manipulator, said working space including said working point, calculating a set of positions of working original point where the hand of the multi-joint manipulator may reach the working space and where degrees of freedom of a proximal end of the multi-joint manipulator are situated, calculating values of evaluation functions representative of preference of working characteristics of the multi-joint manipulator with respect to the respective positions of the set, and comparing values of the evaluation functions and selecting from the set the position of the working original point at which the working characteristics of the multi-joint manipulator are at optimum.

According to another aspect of the present invention, there is provided an apparatus for determining a working original point of a multi-joint manipulator, which comprises means for storing a working pont where a hand mounted at a distal end of the multi-joing manipulator works and a working space of the hand needed for the work, said working space including the working point, means for calculating a set of positions of working original point where the hand of the multi-joing manipulator may reach the working space and for calculating values of evaluation functions representative of preference of working characteristics of the multi-joint manipulator with respect to the respective positions of the set, and means for comparing values of the evaluation functions to select from the set of position of the working original point at which the working characteristics of the multi-joint manipulator are at optimum.

These and other objects, features and advantages of the present invention will become more apparent from the following description of embodiments in conjunction with the accompanying drawings.

BRIEF DESCRIPTION OF THE DRAWINGS

In the accompanying drawings showing the embodiments of the invention.

DETAILED DESCRIPTION OF THE EMBODIMENTS

Figure 1:
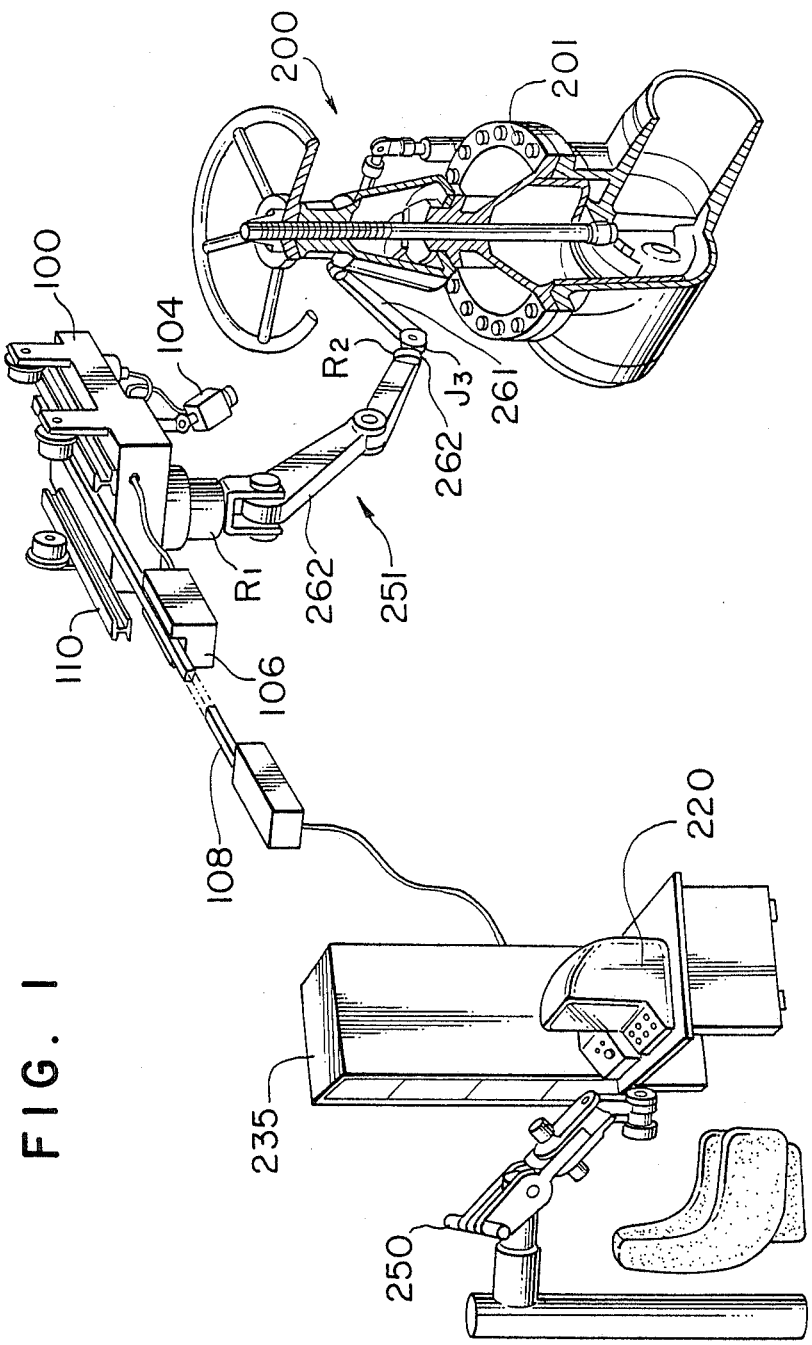
FIG. 1 is a schematic view of a master/slave type manipulation system to which the present invention is applied.

Referring now to FIG. 1, a master/slave type manipulation system to which the present invention is applied will be described. This system includes a master manipulator, a controller and a working manipulator with plural revolute joints. The working manipulator 251 is mounted on a running carriage 100. The running carriage 100 is arranged so as to move on running rails 110 to move the working manipulator 251. A drive power supply for the running carriage 100 and the working manipulator 251 and an electric signal transmission between a console 220 and the working manipulator 251 are performed through an electric power supply rail 108. An electric collector 106 serves to pick up the power and signals. A TV camera 104 is mounted on the running carriage 100.

The working manipulator 251 is moved to a position, where an object of interest is disposed, in accordance with an image information of the camera 104 under the operator's control or the control of the controller 235. Thereafter, a hand of the working manipulator 251 is caused to approach the object to be worked, for example bolts 201 of a valve 200 in the case of FIG. 1, while the manipulator is kept free from obstacles. Subsequently, the working manipulator is operated through the operation of the master manipulator 250 that is located within, for example, an operator's room. Then, a work such as fastening bolts will be performed.

In the manipulation system in accordance with the present invention, when a workspace or working region needed to a hand H of a manipulator for a certain work, the position of the working original point of the manipulator is determined so that the working characteristics thereof are set at optimum. A method for determining the position of the working original point is accordance with one embodiment of the invention will be described with reference to FIG. 2. Incidentally, in the following description, the same reference numerals or characters as those in FIG. 1 will be used to designate like members or components in order to avoid the duplication of the explanations.

Figure 2:
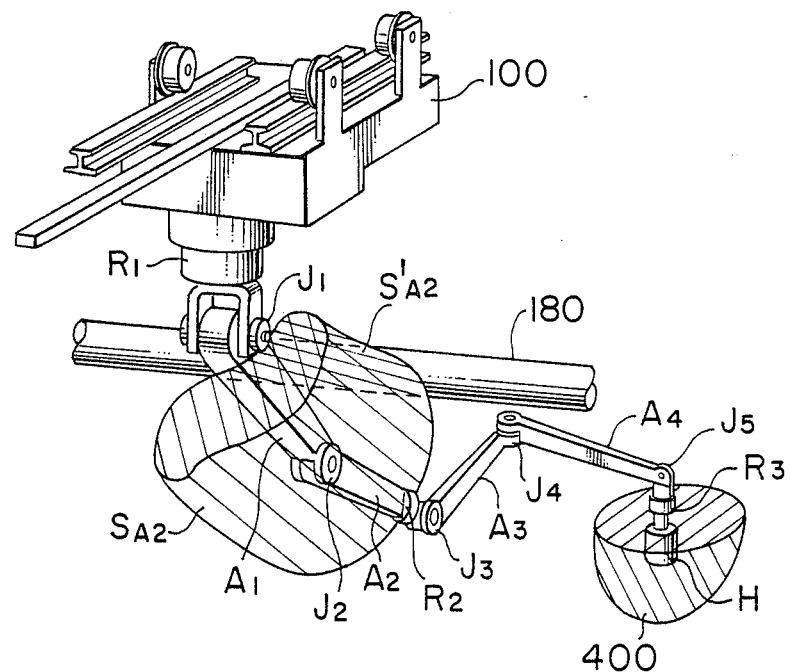
FIG. 2 is a schematic view of a multi-joint manipulator for illustrating a method of determining a working original point in accordance with an embodiment.

The working manipulator shown in FIG. 2 has joints $J_1$ to $J_5$, arms $A_1$ to $A_4$ and rolling portions $R_1$ to $R_3$, to thereby constitute a multi-joint manipulator of 8 degrees of freedom (DOF) including pitching and rolling motions. The working manipulator is mounted on the carriage 100 as in the embodiment shown in FIG. 1. A hand H is mounted on a free end of the working manipulator for a variety of works. In the embodiment shown in FIG. 2, the working original point position is determined by the running carriage 100 with respect to the working region 400 of the hand H, so that the working characteristics of the working manipulator become best. In this case, the working original point is regarded as the center of the rolling portion $R_1$ of the proximal joint $J_1$ of the working manipulator.

The operational or working characteristics of the manipulator are concepts depending on parameters such as workspaces, control methods of the working manipulator (e.g. methods in accordance with the master manipulator) and structures of the manipulators. Therefore, typically, the "optimum working characteristics" meet a requirement that a region where the respective joints and arms of the manipulator may operate without any interference with obstacles be as large as possible, or meet a requirement that output torques of the respective joints and rolling portions be as small as possible in order to minimize an affect against the operational force, or meet the above two requirements simultaneously.

However, in a master/slave type manipulation system, in order to transmit to the master manipulator an external force applied to end effectors of the slave manipulator such as respective joints and grippers, its control system is generally so constructed that static loads or frictions applied to the respective joints of the slave manipulator are compensated for, thus feeding back possible pure external forces. For this reason, there is little fear that the torques or the like of the respective joints of the master manipulator would be changed due to the posture or orientation of the slave manipulator. It is safe to say that there is little fear that the magnitude of the torques would adversely affect the operational characteristics of the master manipulator and the slave manipulator.

Accordingly, a method meeting the above-described first requirement that the region where the manipulator may operate under the existence of obstacles without any interference therewith be as large as possible will be described.

The working original point has been shifted to a certain position by the running carriage 100. At this time, assume that $V_{Ai}$ ($i=1, 2, \ldots$) is the volume of a region that each arm $A_i$ may sweep if there are no obstacles (referred to as an "operative region"). Also assume that $V'_{Ai}$ ($i=1, 2, \ldots$) is the volume of a region that each arm $A_i$ cannot sweep due to existence of obstacles. For example, in FIG. 2, the volume of the operative region $S_{A2}$ of the second arm $A_2$ is represented by $V_{A2}$, and the volume of the region $S'_{A2}$ that the second arm $A_2$ cannot sweep is represented by $V'_{A2}$. The volume of $V'_{A2}$ includes not only the region through which a piping 180 intersects with the operative region $S_{A2}$ but also a region that the arm $A_2$ cannot actually sweep due to the existence of obstacle (the region opposite to the arm $A_2$ with respect to the piping 180 in FIG. 2).

The smaller the ratio of $V'_{Ai}/V_{Ai}$, the wider the region that the arm $A_i$ can sweep without any interference with the obstacle will become.

Alternatively, if the volume of the region where the arm $A_i$ may sweep under the restriction of the obstacle is represented by $V''_{Ai} (= V_{Ai} - V'_{Ai})$ in the volume $V_{Ai}$ of the operative region of the arm $A_i$, the larger the ratio of $V''_{Ai}/V_{Ai}$, the wider the region that the arm $A_i$ may sweep will become.

To estimate a space where the multi-joint manipulator as a whole may move, the above-described volume ratios with respect to all the arms of the manipulator are sought, and its total sum, that is, the following equation (1) or (2) is given as an evaluation function E:

$$E = \sum_{i=1}^{Ka} Wi \frac{V'_{Ai}}{V_{Ai}} \quad (1)$$

or $$E = \sum_{i=1}^{Ka} Wi \frac{V''_{Ai}}{V_{Ai}} \quad (2)$$

where Ka is the number of the arms and Wi is the weighing constant.

Then, the evaluation function E of the equations (1) or (2) is calculated with respect to all the positions of the working original point at which the hand of the manipulator may reach the working region. The optimum working original point is selectd so that the value of the evaluation function (1) is at minimum and the value of the evaluation function (2) is at a maximum.

In order to perform the above-described calculation and evaluation, the position of each joint should be able to be calculated with respect to the working region of the hand of the manipulator. This calculation will be described. Each arm Ai may be represented by the following vector Ai where a length of the arm Ai is represented by li, the length li representing a distance between joints $J_{i-1}$ and Ji, and Jo representing a working original point.

$$Ai = \prod_{n=0}^{i} M'n \begin{bmatrix} 0 \\ 0 \\ li \end{bmatrix} \quad (3)$$

where M'n is the coordinate converting matrix for each joint Jn, determined by the degree of freedom of each joint, and is the function of DOF swivelling amount $\alpha ns$ (s showing the number of DOF, $\alpha n_1$ representing the swivelling amount of the first DOF and $\alpha n_2$ representing the swivelling amount of the second DOF in the case of two DOF). For example, the coordinate converting matrix $M'_1$ with respect to the joint $J_1$ is determined as follows. Since the joint $J_1$ is determined by the DOF of the roll of the rolling portion $R_1$ and the pitch, the following equation is given if the roll is the first DOF and the pitch is the second FOD, $$M'_1 = M'_{11}(\alpha_{11}) \cdot M'_{12}(\alpha_{12}) \quad (4)$$

where, $$M'_{11} = \begin{bmatrix} \cos \alpha_{11} & \sin \alpha_{11} & 0 \\ -\sin \alpha_{11} & \cos \alpha_{11} & 0 \\ 0 & 0 & 1 \end{bmatrix}, \text{ and}$$

$$M'_{12} = \begin{bmatrix} \cos \alpha_{12} & 0 & -\sin \alpha_{12} \\ 0 & 1 & 0 \\ \sin \alpha_{12} & 0 & \cos \alpha_{12} \end{bmatrix}.$$

From equation (3), a position of each joint, $P = (x_{Ji}, Y_{Ji}, z_{Ji})^T$ is given by the following equation (5):

$$P_{Ji} = \sum_{m=1}^{i} \left\{ \sum_{n=1}^{m} M'n \begin{pmatrix} 0 \\ 0 \\ ln \end{pmatrix} \right\}. \quad (5)$$

Therefore, the working region of the hand with respect to the working original point is determined from equation (5). Inversely, the positions of the working original point and each joint with respect to the working region of the hand are given from the following equation (6) by using the coordinate converting matrix M'i and the inverse matrix $M'i^{-1}$:

$$P_{Ji} = \sum_{m=K}^{i} \left\{ \sum_{i=K}^{m} M'_i^{-1} \begin{pmatrix} 0 \\ 0 \\ -li \end{pmatrix} \right\} \quad (6)$$

where K is the DOF of the multi-joint manipulator. The inverse matrix $M'i^{-1}$ is a function of the cosine and sine functions in the same manner as in equation (4).

The above-described embodiment is related to the case where the multi-joint manipulator as a whole is regarded as the working manipulator and the working original point positioning section is composed solely of the running carriage 100. However, in the case where the working manipulator is controlled by the master manipulator 250 as in the system shown in FIG. 1, it is preferable that the manipulator 251 is divided into a working manipulator section and a working original point positioning section. For instance, the manipulator section from the joint $J_3$ to the hand is regarded as a working slave manipulator 261 corresponding to the master manipulator 250. Also, the working original point positioning section is composed of a proximal side manipulator section 262 and the running carriage 100. In such a structure, since the working original point of the slave manipulator 261 is identified with the center of the rolling portion $R_2$ of the proximal joint $J_3$, the working original point is positioned so that it is easy to operate the slave manipulator 261 with the master manipulator 250. Thereafter all the positions of the working original point of the slave manipulator are determined with respect to various works, the fastening work of each bolt 201 constituting one work in the case of FIG. 1. The rolling portion $R_1$ that is the working original point of the proximal manipulator section 262 is determined and positioned by the running carriage 100 so as to meet the working original point positions of the slave manipulator 261 determined as above. Such two determining steps are conducted.

The above-described manipulation system will be described in greater detail with reference to FIGS. 3 through 9.

Figure 3:
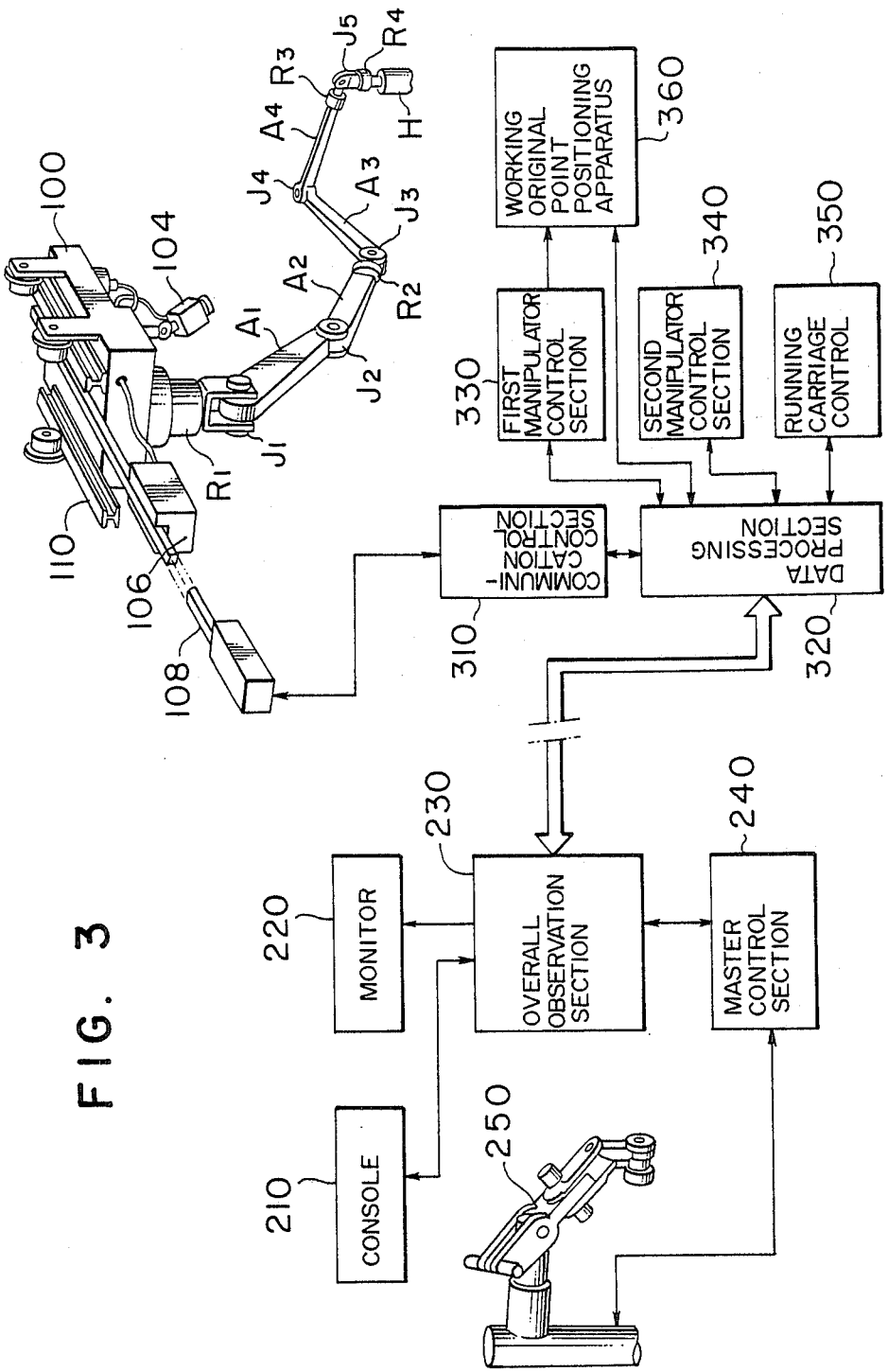
FIG. 3 is a block diagram showing a structure of a controller used in the manipulation system shown in FIG. 1.

FIG. 3 is a schematic view of the manipulation system. The multi-joint manipulator of this system has the arms $A_1$ to $A_4$, joints $J_1$ to $J_5$, and the rolling portiions $R_1$ to $R_4$. The multi-joint manipulator is composed of a first manipulator, that is, the manipulator for positioning the working original point of 3 DOF including a section from the rolling portion $R_1$ to the arm $A_2$, and a second manipulator, that is, the working manipulator of 6 DOF including a section from the rolling portion $R_2$ to the hand wrist $R_4$. The first manipulator is automatically controlled in accordance with a programmed control. The second manipulator constitutes a slave manipulator that is remotely controlled by the master manipulator 250.

The multi-joint manipulator is movable to the object position by the running carriage 100 mounted on the rails 110 as described above. On the other hand, operating and controlling means such as the master manipulator 250, an overall observation section 230 for the multi-joint manipulator and a master control section 240 are located far from the object of interest. The operator operates the master manipulator 250 while watching the image of the work object on a monitor 220 through the TV camera 104 mounted on the running carriage 100. Angular signals of the rolling portions or the like in accordance with the operation of the master manipulator are transmitted to a second manipulator control section 340 through the master control section 240 and the overall observation section 230 for the multi-joint manipulator. The multi-joint manipulator is controlled through a data processing section 320 and communication control section 310 by a first manipulator control section 330, the second manipulator control section 340 and a running carriage control section 350 which are positioned relatively close to the work object. A working original point positioning apparatus 360 is connected to the first manipulator control section 330 in order to position the rolling portion $R_2$ (i.e., the working original point) of the distal end of the arm $A_2$ of the first manipulator.

The positional control of the running carriage 100 and the angular control of the respective joints $J_1$ to $J_5$ and the rolling portions $R_1$ to $R_4$ of the first and second manipulators are performed by rotating DC motors through a motor drive amplifier provided within the running carriage 100. Control signals for the respective DC motors are fed to the motor drive amplifier through the communication control section 310, the signal transmission path or rail 108 and the coupling or collector 106. Incidentally, the DC motors for controlling the angular positions of the joints and rolling portions are disposed at the respective joints and the rolling portions.

Figure 4:
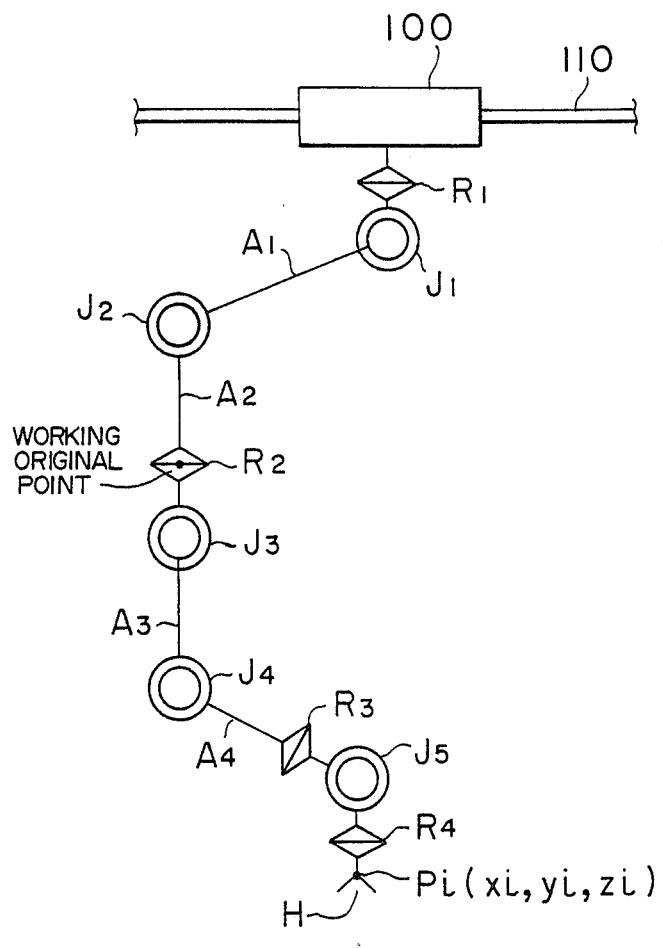
FIG. 4 is a view of a symbolized multi-joint manipulator used in the system shown in FIG. 1 for illustrating a working original point determining method in accordance with another embodiment of the invention.

FIG. 4 is a view showing the running carriage 100 and the multi-joint manipulator mounted on the carriage in FIG. 3 in a symbolized manner. As is apparent from FIG. 4, the multi-joint manipulator in accordance with this embodiment has 10 degrees of freedom (DOF) including the DOF of running.

Subsequently, the method of and the apparatus for determining positions of the working original points in accordance with the control means of the manipulation system shown in FIG. 3 will be described in more detail.

In order to determining the working point of the multi-joint manipulator, after the multi-joint manipulator has been moved close to the object to be worked, it is necessary to introduce the hand of the second manipulator into the working region. This makes it possible to confirm whether or not another obstacle is disposed in addition to the obstacle that is recognized previously.

Figure 5:
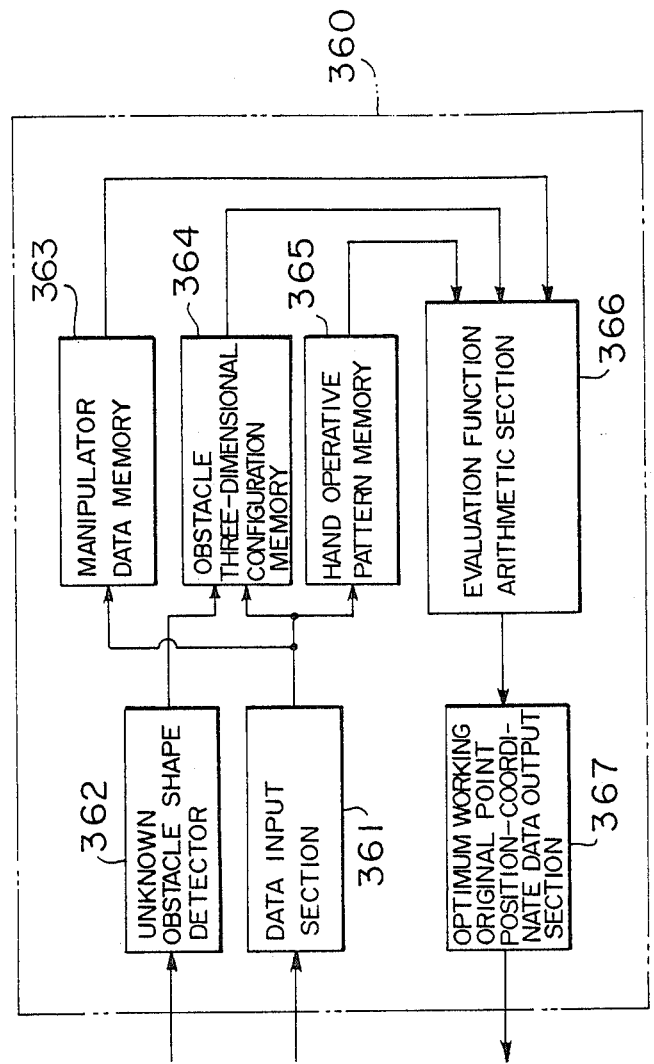
FIG. 5 is a block diagram showing a working original point determining apparatus in accordance with still another embodiment.

FIG. 5 shows a specific structure of the working original point positioning apparatus 360. The apparatus 360 includes a data input section 361, an unknown obstacle shape detector 362, a manipulator data memory 363, an obstacle three-dimensional configuration 364, a hand operative pattern memory 365, an estimation function arithmetic section 366 and an optimum working original point position-coordinate data output section 367.

In the manipulator data memory 363, basic data such as an operational range of each joint of the manipulator and the like are inputted in advance into the memory through the data input section 361 from the console 21 shown in FIG. 3. Also, in the obstacle three-dimensional configuration memory 364, data related to the three-dimension of the real obstacles such as a pipe, a support and the like and the work pieces other than the work object, which work pieces become obstacles against the manipulator, are inputted into the memory in the same manner as in the memory 363. In addition, data of new obstacles that have been found when the hand of the multi-joint manipulator is guided to the work object are inputted and stored into the memory 364 through the unknown obstacle shape detector 362.

Figure 6A:
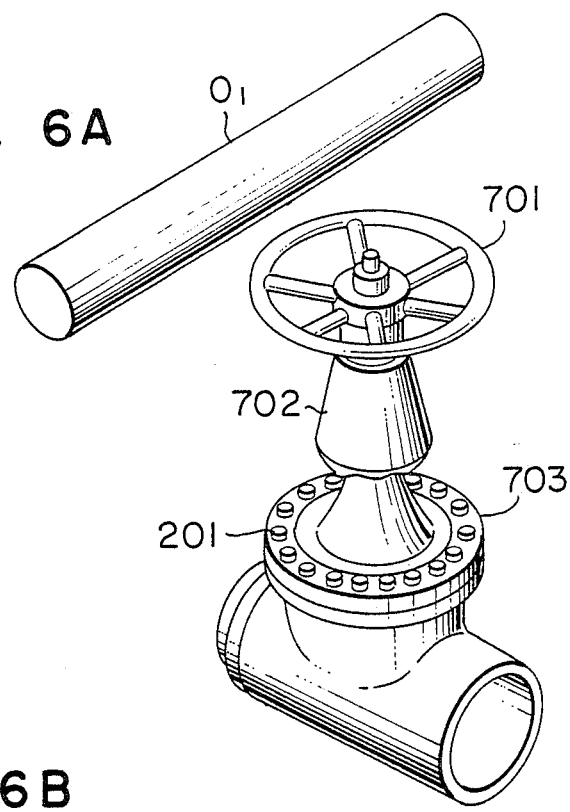
FIGS. 6a and 6b are views showing an example of a method for simplifying a real three-dimensional configuration of an obstacle, stored in the apparatus shown in FIG. 5.
Figure 6B:
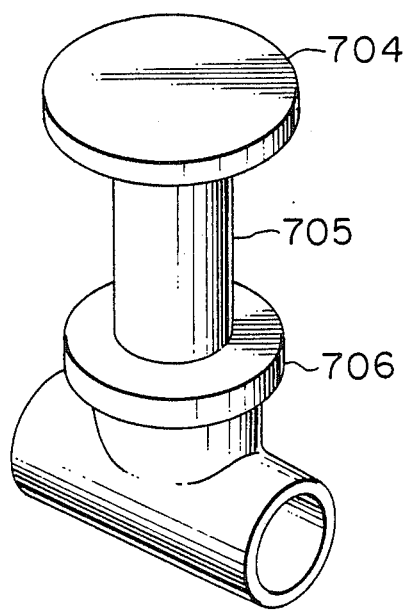

In general, the work object or the obstacle does not necessarily have a simple and regular shape. For example, in the case of the valve shown in FIG. 1, its shape is relatively complicated. Accordingly, it is not practical to input the real shape as data. It is preferable to equivalently convert the real shape data into data that are easy to input. FIGS. 6a and 6b show a method for equivalently converting the obstacle 3-D shape into data that are easy to input. FIG. 6a shows a real shape of the valve, and a handle portion 701, a valve rod casing 702 and flange 703 are complicated in configuration. However, it is possible to replace the real shape composed of the handle portion 701, the valve rod casing 702 and the flange portion 703 by a 3-D shape composed of three cylindrical shapes 704, 705 and 706 shown in FIG. 6b. Thus, the 3-D shape may be expressed only by inputting the center coordinate and the radius of the top and bottom surfaces of each cylindrical shape. In the same manner, with respect to the obstacle of a pipe $O_1$, its cylindrical shape data may be inputted in consideration of the region the multi-joint manipulator may sweep.

Figure 7A:
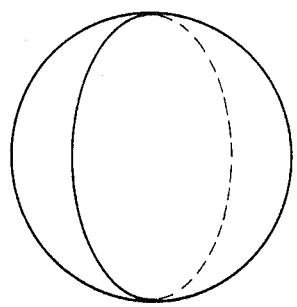
FIGS. 7a, 7b and 7c are diagrams showing examples of working space pattern of a hand, stored in the apparatus shown in FIG. 5, respectively.
Figure 7B:
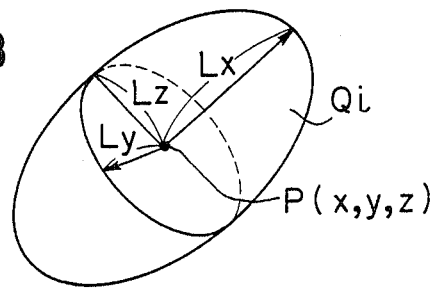
Figure 7C:
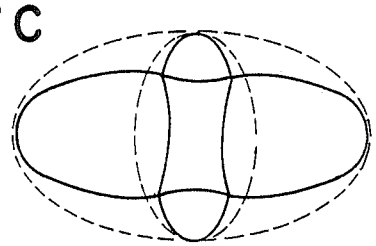

The coordinates $Pi(x_i, Y_i, z_i)$ of the i-th working point is inputted and stored into the hand operative pattern memory 365. In the case where a number of bolts 201 shown in FIG. 6a are objects to be worked, the i-th working point means the position of the i-th bolt. Also, a working region Qi of the hand H of the second manipulator end designated with respect to the working point $Pi (x_i, Y_i, z_i)$ shown in FIG. 4 is stored in the hand operative pattern memory 365. The working region of the hand depends on a kind of the work to be done by the hand. The working region is selected for each working point from a plurality of 3-D working region patterns predetermined in advance in accordance with the kind of the work. Typically, an elliptic body as shown in FIG. 7b is defined as the working region pattern, and a length Lx of its longest axis and lengths Ly and Lz of axes perpendicularly intersecting with the longest axis are assigned and stored. Also, the direction or orientation of the longest axis is assigned and stored as a vector. In the case where the working region of the hand is in the form of a spherical body as shown in FIG. 7a, this may be regarded as a particular case of the elliptic bodies (Lx=Ly=Lz). Also, the working region as shown in FIG. 7c may be represented by the elliptic body shown in FIG. 7b.

In the estimation function arithmetic section 366, calculated is a position of the optimum working original point of the second manipulator such that the estimation function to be later described is at maximum, with respect to the working point $Pi (x_i, Y_i, z_i)$ and the working region Qi of the hand corresponding to the working point Pi.

Figure 8:
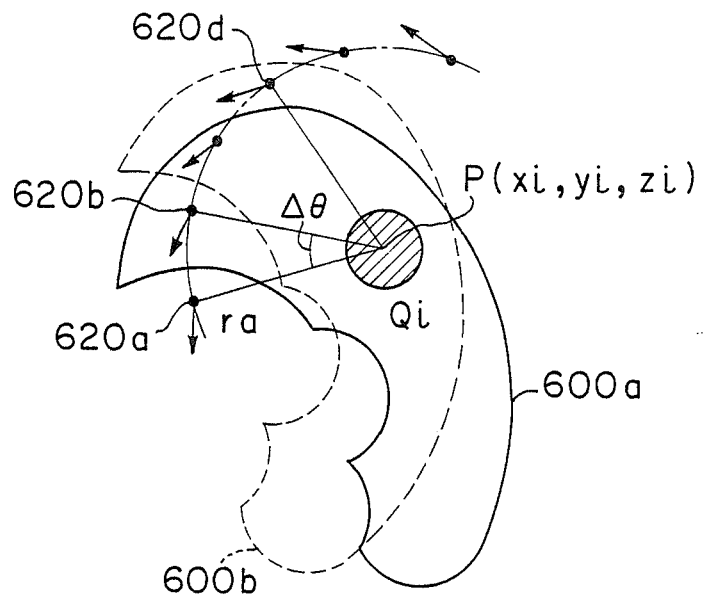
FIG. 8 is a diagram showing a process for seeking a range in which the working original point may be situated in the apparatus shown in FIG. 5.

FIG. 8 is an illustration of a process for determining the optimum working original point of the second manipulator from the hand working region Qi and the working point $Pi (x_i, Y_i, z_i)$. As shown in FIG. 8, first of all, a pattern 600a showing the hand operative space of the second manipulator and including the working region Qi is set at a predetermined position. More specifically, the position of the working point at this time is known and is regarded as a point 620a in FIG. 8, so that the hand working point Pi determined from the orientation of the second manipulator at this time corresponds to a single point within the hand operative space pattern 600a. Therefore, it is necessary to set the pattern 600a by corresponding the single point within the hand operative space pattern 600a to the working point Pi within the real space. By storing in advance some operative space patterns of the second manipulator into the working original point positioning apparatus 360, it is possible to automatically set the operative space pattern 600a after the above-described corresponding operation. Also, it is possible for the operator to assign the operative space pattern 600a by obtaining the corresponding point in an off-line manner based upon the orientation data of the second manipulator at this time.

Subsequently, as shown in FIG. 8, the operative space pattern 600a is rotated in a step-by-step manner by a predetermined angle $\Delta\theta$ around the working point Pi. Reference character 600b designates an operative space pattern that has been rotated by. The operative space pattern of the hand of the second manipulator and the working original point position corresponding to the pattern are kept under a constant relation. When the operative space pattern is rotated, therefore, the corresponding working original point forms an arcuate trajectory.

On the other hand, from the condition that the above-described original point be included in the operative space of the distal end of the first manipulator, the region of the arcuate trajectory of the working original point of FIG. 8 is limited. As a result, an existence range of the allowable rest working original points includes points 620a to 620d.

From the thus selected existence range of the working original points, the evaluation function for estimating a magnitude of the operative space in view of the obstacles against the second manipulator is calculated in the arithmetic section 366.

Figure 9:
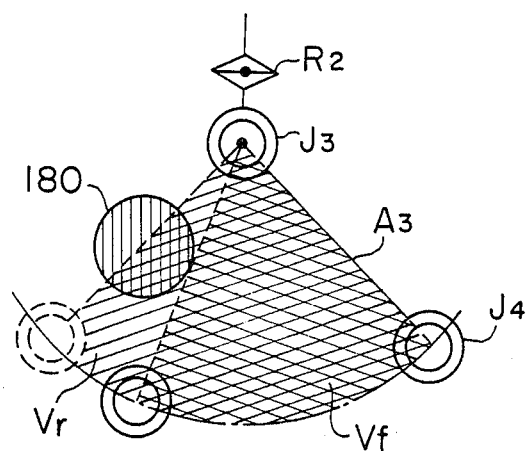
FIG. 9 is a diagram showing a method for calculating evaluation function in the apparatus shown in FIG. 5.

FIG. 9 illustrates the method of calculating the above-described evaluation function. In FIG. 9, the center of the rolling portion $R_2$ is the working original point. First, the explanation will be made as to the first arm $A_3$ of the second manipulator. If the overall volume of the operative region swept by the arm $A_3$ is represented by $(Vr+Vf)_3$, assuming that the arm $A_3$ might be free from the obstacle 180, and if the overall volume of the region swept by the arm $A_3$ under the restriction of the obstacle 180 is represented by $(Vf)_3$, the value given by the following formula (6) is regarded as the evaluation value with respect to the first arm $A_3$:

$$\frac{(Vf)_3}{(Vr + Vf)_3} \quad (6)$$

The like estimation is made as to the second arm $A_4$ and the third arm $A_5$, and the total sum E of the evaluation values represented by the following formula (7) is regarded as the estimation function.

$$E = \sum_{j=3}^{5} \frac{(Vf)_j}{(Vr + Vf)_j} \quad (7)$$

Thus, the value of the evaluation function E is sought with respect to each working original point included in the allowable working original point-existence range 620a to 620d as shown in FIG. 8. For instance, the value E corresponding to the working original point 620a is represented by E(a).

In the calculation of the evaluation function, when there is a difference in maximum operative angular motion among the joints, it is possible to effect a weighing constant Wi in response to the maximum operative angular motion (see equations (1) and (2)).

Finally, such a working original point is sought and determined from the respective working original points included in the allowable working original point-existence range 620a to 620d that the evaluation function E obtained from the equation (7) is at maximum. Namely, the position Gi of the optimum original point with respect to the working point Pi is determined by the following formula (8):

$$\max\{E(l), l=a \text{ to } d\} \rightarrow Gi \quad (8).$$

Thus, the optimum working original point Gi with respect to the working point Pi ($x_i$, $Y_i$, $z_i$) is determined. When there are a plurality of working points Pi, the optimum working original point Gi with respect to each working point Pi may be determined in the same manner as in the foregoing steps. The thus determined optimum working original point position is outputted to the data processing section 320 through the optimum working original point position-coordinate data output section 320.

Figure 10:
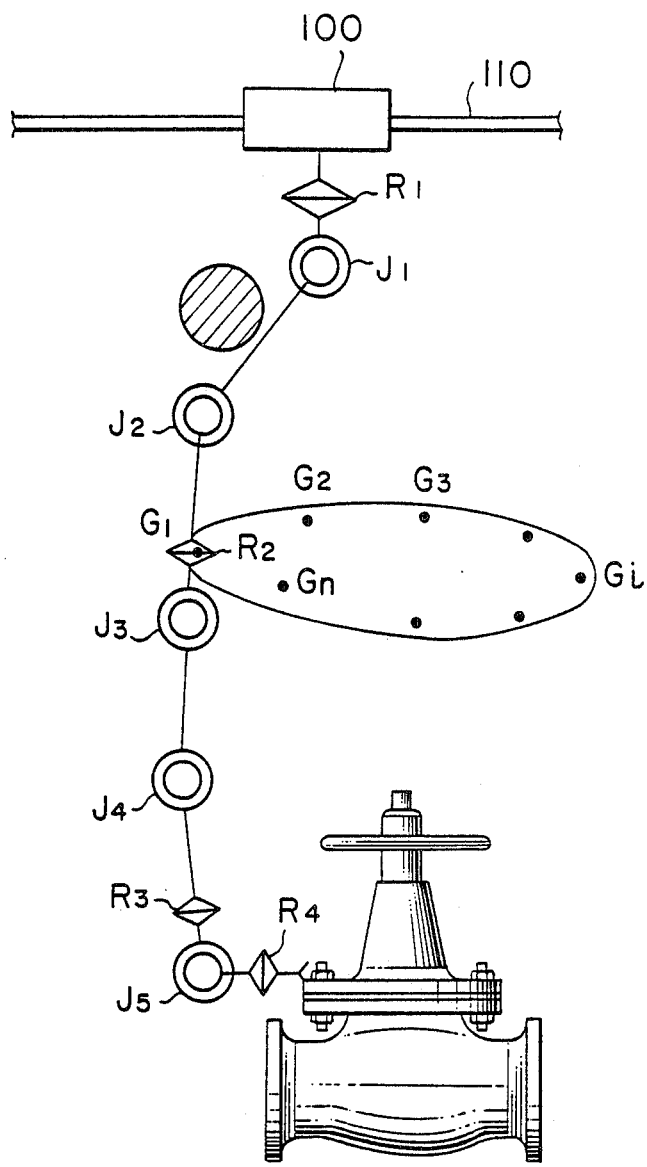
FIG. 10 is a schematic view showing a process for determining the working original point of a first manipulator on a proximal side of the multi-joint manipulator in the apparatus shown in FIG. 5.

FIG. 10 illustrates the method of positioning the rolling portion $R_1$, which is the working original point of the first manipulator, by way of example of the valve bolt fastening work. The valve is provided with a plurality of bolts. The position of each bolt serves as a working point of the hand of the second manipulator. In this case, in accordance with the foregoing method, an optimum working original point position Gi (i=1, ..., n) with respect each of the plurality of working points Pi is determined. These working original point Gi are regarded as working points for the first manipulator, and it is possible to regard the set of the respective working points Gi as the working region of the first manipulator. Accordingly, this working region is converted into the working region pattern of FIG. 7, and the position of the working original point $R_1$ of the first manipulator and the position of the running carriage 100 may be determined in the same manner as in the positioning of the working original point $R_2$ of FIG. 4. In this case, due to the one-dimensional movement of the carriage 100, it is sometimes impossible to perform the operation at some of the working points Gi (i=1 to n) with the manipulation from a single position of the running carriage 100. The reason for this is that each working point Gi (i=1 to n) has a vector to thereby restrict the orientation.

Figure 11:
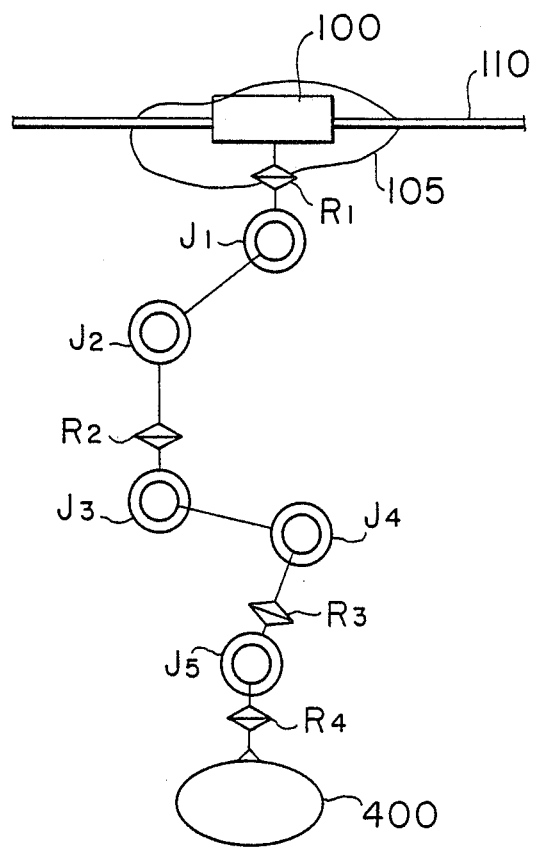
FIG. 11 is a schematic view of the multi-joint manipulator for illustrating a method for determining the working original point in accordance with still another embodiment of the invention.

The embodiment has been described in which the multi-joint manipulator is composed of the first manipulator controlled by programs and the second manipulator operated under the control of the master manipulator. The method according to another embodiment of the present invention is applicable to the case where a manipulator of 9 DOF is operated by fully programmed method as shown in FIG. 11. In the case of the fully programmed manipulator, it is possible to utilize the algorithm that is used for determining the working original point of the above-described slave manipulator. However, the pattern 600a that is used as the operative region of the hand of the second manipulator in conjunction with FIG. 8 should be replaced by another pattern of the 9 DOF multi-joint manipulator, and the evaluation function should be calculated by the following equation (9):

$$E = \sum_{j=1}^{5} \frac{(Vf)_j}{(Vr + Vf)_j} \qquad (9)$$

There is a difference between the 9 DOF manipulator and the 6 DOF manipulator in that the position of the running carriage is not determined in one-to-one relation with respect to a single vector of the hand in the manipulator of 7 DOF or more. Therefore, it is necessary to determine the optimum working original point (the position oof the running carriage) from a certain working range 105 as shown in FIG. 11.

As described above, according to the present invention, it is possible to determine the position of the working original point at which the working characteristics of a manipulator may be at optimum. This makes it easy to carry out the work of the manipulator. Also, it is possible to considerably reduce a period of time needed for the work. In the case of the master/slave type system, it is possible to considerably reduce an operator's fatigue.

In the foregoing description, the specific embodiments have been explained but the invention is not limited thereto or thereby. For instance, other evaluation functions may be used for estimating the working original point as desired. It is possible to determine the working original point by using an evaluation function based upon the concept that it is preferable to determine the position of the working original point so that the torques of the DC motors of the joints and rolling portions are at minimum. Such evaluation function is effective to reduce a load or labor to be imposed on the master-manipulator-operator in the master/slave manipulation system in which the foregoing compensation is not carried out.

What is claimed is:

1. A method of determining a working original point for a multi-joint manipulator, comprising the steps of:

assigning a working point at which a hand mounted at a distal end of the multi-joint manipulator is operated and a working region needed for a work of the multi-joint manipulator, said working region including said working point;

calculating a set of positions of the working original point where the hand of said multi-joint manipulator may reach said working region and where at least one degree of freedom of a proximal end of said multi-joint manipulator is situated;

calculating values of evaluation functions representative of preference of working characteristics of said multi-joint manipulator with respect to the respective positions of said set; and comparing the values of said evaluation functions and selecting from said set a position of the working original point at which the working characteristics of said multi-joint manipulator are optimum.

2. The method according to claim 1, wherein a ratio of a volume of a region where each arm of said multi-joint manipulator may sweep under a condition that there be an obstacle, to a volume of a region where the same arm may sweep under a condition that there be no obstacle is calculated and a total sum of the ratios calculated with respect to all the arms of said multi-joint manipulator is used as said evaluation function, the method further comprising selecting a position of the working original point at which said total sum is at maximum.

3. The method according to claim 1, wherein a ratio of a volume of a region where each arm of said multi-joint manipulator may not sweep under a condition that there be an obstacle, to a volume of a region where the same arm may sweep under a condition that there is no obstacle is calculated and a total sum of the ratios calculated with respect to all the arms of said multi-joint manipulator is used as said evaluation function, the method further comprising selecting a position of the working original point at which said total sum is at minimum.

4. The method according to claim 1, wherein said multi-joint manipulator includes a first manipulator on a proximal side for determining the working original point position and a second manipulator on a distal side for working, the method further comprising selecting the working original point of said second manipulator at which the working characteristics of said second manipulator are at optimum, and further selecting the working original point of said first manipulator with the working original point of said first manipulator regarded as a working point for said first manipulator.

5. An apparatus for determining a working original point of a multi-joint manipulator, comprising:

means for storing a working point where a hand mounted at a distal end of the multi-joint manipulator works and a working region of the hand needed for a work, said working region including the working point;

means for calculating a set of positions of the working original point where the hand of the multi-joint manipulator may reach the working region and where at least one degree of freedom of a proximal end of said multi-joint manipulator is situated, and for calculating values of evaluation functions representative of preference of working characteristics of the multi-joint manipulator with respect to the respective positions of said set; and means for comparing the values of said evaluation functions and for selecting from said set a position of the working original point at which the working characteristics of the multi-joint manipulator are optimum.

6. The apparatus according to claim 5, wherein said means for storing the working point and the working region includes a hand operative pattern memory for storing three-dimensional coordinates of each working point, a length of the longest axis of the working region representative of an elliptic pattern and lengths of two axes that are perpendicularly intersect with said longest axis.

7. The apparatus according to claim 6, wherein said means for calculating the set of the positions and the evaluation function includes a manipulator data memory for storing a region that each arm of said multi-joint manipulator may sweep and a present position of said arm, an obstacle three-dimensional configuration memory for storing a three-dimensional configurations of obstacles located around said each working point, and an evaluation function arithmetic section, said arithmetic section calculating the set of the positions of the working original point and the evaluation functions based upon data of three said memories.

8. The apparatus according claim 7, wherein said evaluation function arithmetic section calculates a ratio of a volume of a region where each arm of said multi-joint manipulator may sweep under a condition that there be an obstacle, to a volume of a region where the same arm may sweep under a condition that there be no obstacle so as to use a total sum of the ratios calculated with respect to all the arms of said multi-joint manipulator is used as said evaluation function, and said means for selecting the position of the working original point selects a position at which said total sum is at maximum.

9. The apparatus according to claim 7, wherein said evaluation function arithmetic section calculates a ratio of a volume of a region where each arm of said multi-joint manipulator may not sweep under a condition that there be an obstacle, to a volume of a region where the same arm may sweep under a condition that there be no obstacle so as to use a total sum of the ratios calculated with respect to all the arms of said multi-joint manipulator is used as said evaluation function, and said means for selecting the position of the working original point selects a position at which said total sum is at minimum.

10. A multi-joint manipulator apparatus comprising:
   a running carriage movable close to or away from an object to be worked;
   a multi-joint manipulator mounted on said carriage, said multi-joint manipulator having at its distal end a hand for carrying out a work;
   means for driving respective arms of said multi-joint manipulator;
   means for controlling a movement of said running carriage and a drive of each arm of said multi-joint manipulator under a remote control; and
   means for determining a working original point at which working characteristics of said multi-joint manipulator are optimum and at which at least one degree of freedom of a proximal end of said multi-joint manipulator is situated;
   said working original point determining means including: a data input section connected to said control means; a hand operative pattern memory for storing a working point at which a hand mounted on a distal end of said multi-joint maniuplator works and a working region of the hand needed for the work, said working region including said working point, said working point and said working region being inputted into said hand operative pattern memory through said data input section; a manipulator data memory for storing a region that each arm of said multi-joint manipulator may sweep and a present position of said arm; an obstacle three-dimensional configuration memory for storing three-dimensional configurations of obstacles located around said each working point; an evaluation function arithmetic section; and an optimum working original point position-coordinate data output section;
wherein said evaluation function arithmetic section is adapted to calculate, on the basis of data of three said memories, a set of positions of the working original point at which the hand may reach said working region, to calculate values of evaluation functions representative of preference of the working characteristics of said multi-joint manipulator, to comparing the values of the evaluation functions, and to select a position of the working original point at which the working characteristics of said multi-joint manipulator are at optimum, said data output section is adapted to output the selected working original point position to said control means, whereby said multi-joint manipulator is moved so that its working original point is located at the selected position.

* * * * *